US011526580B2

United States Patent
Chu et al.

(10) Patent No.: US 11,526,580 B2
(45) Date of Patent: Dec. 13, 2022

(54) DATA CORRECTION METHOD AND APPARATUS, ELECTRONIC DEVICE AND COMPUTER-READABLE STORAGE MEDIUM

(71) Applicants: Beijing BOE Optoelectronics Technology Co., Ltd., Beijing (CN); BOE TECHNOLOGY GROUP CO., LTD., Beijing (CN)

(72) Inventors: Minglei Chu, Beijing (CN); Zehua Dong, Beijing (CN); Hao Zhang, Beijing (CN); Lili Chen, Beijing (CN); Yukun Sun, Beijing (CN); Yakun Wang, Beijing (CN); Xuefeng Wang, Beijing (CN); Jinghua Miao, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 300 days.

(21) Appl. No.: 16/669,647

(22) Filed: Oct. 31, 2019

(65) Prior Publication Data
US 2020/0242191 A1 Jul. 30, 2020

(30) Foreign Application Priority Data
Jan. 30, 2019 (CN) .......................... 201910093391.9

(51) Int. Cl.
*G06F 17/16* (2006.01)
*G06T 19/00* (2011.01)
(Continued)

(52) U.S. Cl.
CPC ............. *G06F 17/16* (2013.01); *G01C 17/38* (2013.01); *G01C 25/00* (2013.01);
(Continued)

(58) Field of Classification Search
CPC ...... G06F 17/16; G06F 11/3089; G06F 3/011; G06T 19/006; G01C 17/38; G01C 17/28; G01C 17/30; G01C 21/20; G01C 25/00
(Continued)

(56) References Cited

U.S. PATENT DOCUMENTS

| 2008/0033679 A1 | 2/2008 | Kamada et al. |
| 2013/0060470 A1* | 3/2013 | Handa ................... G01C 17/38 |
| | | 702/2 |

(Continued)

FOREIGN PATENT DOCUMENTS

| CN | 101031803 | 9/2007 |
| CN | 103399175 | 11/2013 |

(Continued)

OTHER PUBLICATIONS

Office action from Chinese Application No. 201910093391.9 dated May 28, 2020.
(Continued)

*Primary Examiner* — John E Johansen
(74) *Attorney, Agent, or Firm* — Calfee, Halter & Griswold LLP

(57) ABSTRACT

A method for correcting data sensed by a sensor includes: acquiring the data sensed by the sensor; establishing a surface equation based on an acquired data to performing surface fitting; and correcting the data sensed by the sensor with the surface equation. The method further includes: evaluating the acquired data sensed by the sensor to update fitting parameters of the surface equation so as to obtain an updated surface equation; and correcting the data sensed by the sensor with the updated surface equation. Parameter data sensed by the sensor can be corrected in real time, which reduces the influence of environmental factors on the parameter data sensed by the sensor and improves the accuracy of the data sensed by the sensor.

8 Claims, 4 Drawing Sheets

(51) Int. Cl.
  *G06F 11/30* (2006.01)
  *G01C 17/38* (2006.01)
  *G01C 25/00* (2006.01)
  *G06F 3/01* (2006.01)

(52) U.S. Cl.
  CPC ........ *G06F 11/3089* (2013.01); *G06T 19/006* (2013.01); *G06F 3/011* (2013.01)

(58) Field of Classification Search
  USPC .......................................................... 703/2
  See application file for complete search history.

(56) References Cited

U.S. PATENT DOCUMENTS

| | | | |
|---|---|---|---|
| 2013/0345972 | A1 | 12/2013 | Askarpour |
| 2015/0177020 | A1 | 6/2015 | An et al. |
| 2016/0273915 | A1* | 1/2016 | Bratski et al. .......... G06F 3/017 382/103 |
| 2160/0273915 | * | 9/2016 | Kitamura et al. ..... G01C 17/38 702/92 |

FOREIGN PATENT DOCUMENTS

| | | | |
|---|---|---|---|
| CN | 103557866 | A | 2/2014 |
| CN | 104204734 | | 12/2014 |
| CN | 104884902 | | 9/2015 |
| CN | 107024674 | | 8/2017 |
| CN | 107024674 | A * | 8/2017 ........... G01C 25/005 |
| CN | 107894241 | | 4/2018 |
| CN | 108020800 | | 5/2018 |
| CN | 108020800 | A * | 5/2018 |
| CN | 108037318 | | 5/2018 |
| CN | 108195399 | | 6/2018 |
| CN | 108344963 | | 7/2018 |
| CN | 108426571 | | 8/2018 |
| CN | 109238311 | | 1/2019 |
| EP | 3276302 | | 1/2018 |

OTHER PUBLICATIONS

Office action from Chinese Application No. 201910093391.9 dated Sep. 25, 2020.

* cited by examiner

DATA CORRECTION METHOD AND APPARATUS, ELECTRONIC DEVICE AND COMPUTER-READABLE STORAGE MEDIUM

CROSS REFERENCE TO RELATED APPLICATIONS

The present application claims the priority benefits of the patent application No. 201910093391.9 filed to the Patent Office of China on Jan. 30, 2019, the disclosure of which is incorporated herein by reference.

TECHNICAL FIELD

This disclosure relates to the field of virtual reality technologies, and specifically to a method and apparatus for correcting data sensed by a sensor, an electronic device and a computer-readable storage medium.

BACKGROUND

Virtual reality (VR) refers to a technology to provide a user with simulations of visual, auditory, tactile or other senses through a three-dimensional virtual world generated by means of computer simulation, the simulations are so immersive that the user feels like observing things within a three-dimensional space in a timely and unrestricted manner. The VR technologies mainly involve environment simulation, perception, natural skills and sensing equipment and so on. Environment simulation refers to real-time and dynamic three-dimensional realistic images generated by a computer; perception refers to all senses of a human being that an ideal VR should possess, including, in addition to the visual sense generated by computer graphics techniques, auditory, tactile, force, and motion, and even olfactory and gustatory senses, and thus is also known as multi-perception; natural skills refer to head rotation, eye movement, gesture or other human body movements, and the computer processes data adapted to the user's movements, makes a real-time response to an input of the user and feeds it back to the five sense organs of the user; the sensing equipment refers to a three-dimensional interactive device, also known as a VR device.

In a VR device, sensors may provide data such as gyro data, gravitational acceleration data and geomagnetic data, and these data can be utilized to obtain a VR pose in real time through pose fusion algorithm. In order to obtain an accurate VR pose, it is usually necessary to perform factory calibration on the gravitational acceleration data and the geomagnetic data.

SUMMARY

An embodiment of the disclosure provides a method for obtaining a pose for a VR device, the VR device comprising a sensor, the method comprising: sensing data of the VR device by means of the sensor, the data comprising at least one selected from a group consisting of gyro data, gravitational acceleration data and geomagnetic data; establishing a surface equation based on the data sensed by the sensor to perform surface fitting; correcting the data sensed by the sensor with the surface equation to acquire corrected data; and obtaining the pose for the VR device based on the corrected data. The method further comprises: evaluating the data sensed by the sensor to update fitting parameters of the surface equation so as to obtain an updated surface equation, and correcting the data sensed by the sensor with the updated surface equation to acquire the corrected data. The evaluating the data sensed by the sensor to update fitting parameters of the surface equation so as to obtain the updated surface equation comprises: calculating a modulus of the data sensed by the sensor; calculating a standard deviation of a plurality of data including the data; and in response to the modulus of the data being in a first threshold range and the standard deviation being smaller than a second threshold, updating the fitting parameters of the surface equation to obtain the updated surface equation.

In some embodiments, the sensor comprises a gravitational acceleration sensor or a geomagnetic field sensor.

In some embodiments, the establishing the surface equation based on the acquired data to perform surface fitting comprises: establishing an ellipsoid equation based on the acquired data to perform ellipsoid fitting, the updating the fitting parameters of the surface equation to obtain the updated surface equation comprises: updating the fitting parameters of the ellipsoid equation to obtain an updated ellipsoid equation.

In some embodiments, the establishing the ellipsoid equation based on the acquired data to perform ellipsoid fitting comprises: establishing a data index table to store the data sensed by the sensor, and establishing the ellipsoid equation based on the data in the data index table to perform the ellipsoid fitting.

In some embodiments, the updating the fitting parameters of the ellipsoid equation to obtain the updated ellipsoid equation comprises: replacing the data stored in the data index table with updated data, a modulus of the updated data being in the first threshold range and a standard deviation of a plurality of the updated data being smaller than the second threshold.

In some embodiments, the data sensed by the sensor comprises geomagnetic data or gravitational acceleration data, and a storage address of the data in the data index table is $(ix+n) \times N \times N + (iy+n) \times N + (iz+n)$, where ix is integer data to which a first coordinate axis component of a vector of the geomagnetic data or the gravitational acceleration data is rounded down, iy is integer data to which a second coordinate axis component of the vector of the geomagnetic data or the gravitational acceleration data is rounded down, and iz is integer data to which a third coordinate axis component of the vector of the geomagnetic data or the gravitational acceleration data is rounded down, ix, iy and iz all falling in the range of $[-n, +n]$, a storage size of the data index table is $N \times N \times N$; n and N are both positive integers, $N=2n+1$.

In some embodiments, the correcting the data sensed by the sensor with the updated surface equation comprises: calculating an ellipsoid center matrix and a correction matrix using the fitting parameters of the updated ellipsoid equation; calculating a difference between a vector of the data sensed by the sensor and the ellipsoid center matrix to obtain a matrix difference, and transposing the matrix difference to obtain a transposition of the matrix difference, and calculating a product of the correction matrix and the transposition of the matrix difference to obtain corrected data.

Another embodiment of the disclosure provides a VR device comprising a sensor, the VR device comprising: an acquisition module configured to acquire the data sensed by the sensor, the acquisition module comprising an analog to digital conversion circuit and a storage circuit; a data fitting module configured to establish a surface equation based on the data sensed by the sensor to perform surface fitting; a data correcting module configured to correct the data sensed by the sensor with the surface equation a fitting parameter updating module configured to evaluate the acquired data sensed by the sensor to update fitting parameters of the surface equation so as to obtain an updated surface equation; and a pose obtaining module configured to obtain the pose for the VR device based on the corrected data. The data correcting module is further configured to correct the data sensed by the sensor with the updated surface equation. The sensor comprises a gravitational acceleration sensor or a geomagnetic field sensor, the fitting parameter updating module comprises a first calculation module configured to calculate a modulus of the data sensed by the sensor and a standard deviation of a plurality data including the data sensed by the sensor, and the fitting parameter updating module is configured to, in response to the modulus of the data being in a first threshold range and the standard deviation being smaller than a second threshold, update the fitting parameters of the surface equation to obtain the updated surface equation.

In some embodiments, the data fitting module is configured to establish an ellipsoid equation based on the acquired data to perform ellipsoid fitting, and the fitting parameter updating module is configured to update the fitting parameters of the ellipsoid equation to obtain an updated ellipsoid equation.

In some embodiments, the VR device comprises a memory configured to store the data sensed by the sensor, the data fitting module establishes the ellipsoid equation based on the data stored in the memory to perform the ellipsoid fitting, and the fitting parameter updating module is further configured to replace the data stored in the memory with updated data, a modulus of the updated data being in the first threshold range and a standard deviation of a plurality of the updated data being smaller than the second threshold.

In some embodiments, the data correcting module comprises a second calculation module, the second calculation module is configured to calculate an ellipsoid center matrix and a correction matrix using the fitting parameters of the updated ellipsoid equation, calculate a difference between a vector of the data sensed by the sensor and the ellipsoid center matrix to obtain a matrix difference, transpose the matrix difference to obtain a transposition of the matrix difference, and calculate a product of the correction matrix and the transposition of the matrix difference to obtain corrected data.

Another embodiment of the disclosure provides an electronic device comprising a processor, the processor being configured to implement the method according to any of the foregoing method embodiments.

Yet another embodiment of the disclosure provides a non-transitory computer-readable storage medium comprising a computer program, the computer program being configured to implement the method according to any of the foregoing method embodiments when running on a computer.

Additional embodiments and advantages of this disclosure will be set forth in the following depictions, and they will become obvious through the following depictions or well understood through implementation of the technical solutions provided in the embodiments of this disclosure.

BRIEF DESCRIPTION OF DRAWINGS

In order to illustrate technical solutions of the embodiments of the disclosure more clearly, drawings involved in depictions of the embodiments of this disclosure will be briefly introduced as follows.

DETAILED DESCRIPTION OF EMBODIMENTS

Figure 1A:
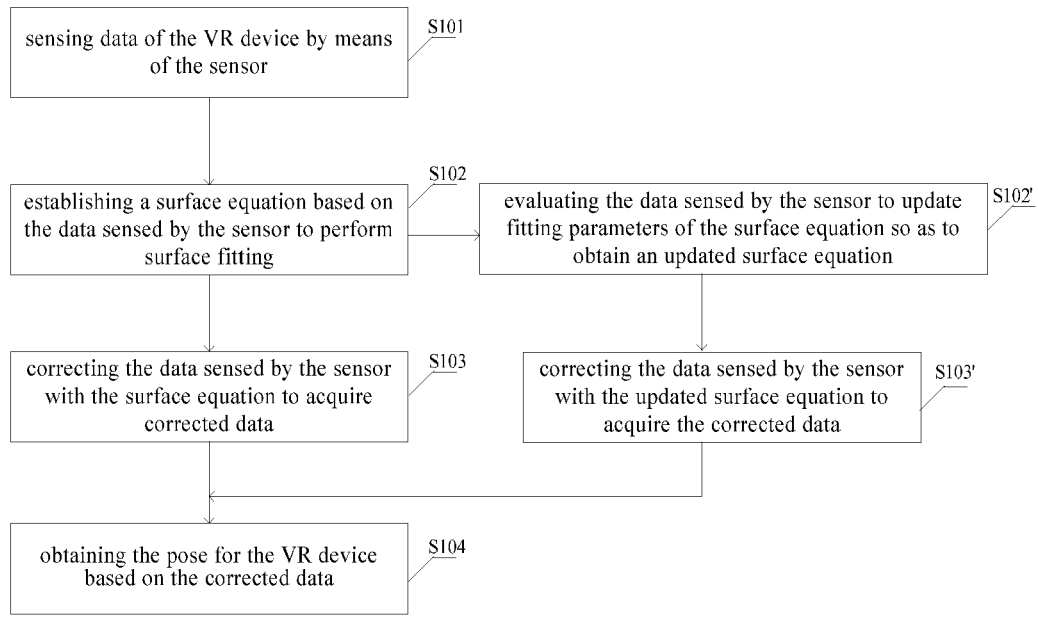
FIG. 1A is a schematic flow chart showing a method for obtaining a pose for a VR device provided in an embodiment of this disclosure.

The embodiments of the application will be described in detail and examples of the embodiments will be shown in the drawings, where same or similar signs are used to indicate same or similar elements or elements having same or similar functions throughout the description. The embodiments described below with reference to the drawings are illustrative, and they are only intended to explain the disclosure of the present application, but cannot be construed as limiting the protection scope of the application.

Those skilled in the art can understand that, unless specified otherwise, the singular forms such as "one", "a", "the" and "said" herein may also means plurality. It should be further understood that the wording such as "comprise" and "include" mentioned in the description of the application refers to the presence of features, integers, steps, operations, elements and/or components listed after the wording, but does not exclude the presence or addition of one or more other features, integers, steps, operations, elements, components and/or a combination thereof. It should be understood that where an element is described to be "connected" or "coupled" to another element, the two elements may be connected or coupled directly, or a further intermediate element may exist between them. Besides, the wording "connect" or "couple" herein may comprise wireless connection or wireless coupling. The wording of "and/or" used herein is intended to comprise all or any unit of one or more associated items listed out and all combinations thereof.

Inventors of the application have realized that, currently, correction of data sensed by a sensor is performed by one-time correction of the data from the sensor at the beginning of the use of a VR device. However, in this case, there is still a defect of inaccuracy of the data during the use of the VR device.

An embodiment of the disclosure provides a method for obtaining a pose for a VR device comprising a sensor, with this method, the data sensed by the sensor can be corrected in real time, which reduces the influence of environment on a device comprising the sensor during usage and improves the accuracy of sensing.

As shown in FIG. 1A, the method for obtaining a pose for a VR device according to the embodiments of the disclosure comprises the following steps: S101, sensing data of the VR device by means of the sensor, the data comprising at least one selected from a group consisting of gyro data, gravitational acceleration data and geomagnetic data; S102, establishing a surface equation based on the data sensed by the sensor surface fit the data; S103, correcting the data sensed by the sensor with the surface equation to acquire corrected data; and S104, obtaining the pose for the VR device based on the corrected data. On this basis, the method provided in the embodiments of the disclosure further comprises: S102', evaluating the data sensed by the sensor to update fitting parameters of the surface equation so as to obtain an updated surface equation; and S103', correcting the data sensed by the sensor with the updated surface equation to acquire the corrected data. FIG. 1A only schematically shows some steps involved in the method according to the embodiments of this disclosure, and serial numbers for the steps are only for the convenience of depictions below, and FIG. 1A and these serial numbers do not mean the execution sequence of the steps. The phrase "surface fit the data" herein means perform surface fitting to the data.

The method for obtaining a pose for a VR device provided in the embodiments herein includes correcting data sensed by a sensor, which is based on performing surface fitting to the data, i.e., establishing a surface equation based on the data sensed by the sensor, and performing calculation with the sensed data and the surface equation to obtain corrected data. During the operation of a device with the sensor, the fitting parameters of the previously established surface equation may be updated in accordance with the data sensed by the sensor in real time, so the sensed data can be corrected according to the updated surface equation. In this way, the data sensed by the sensor can be corrected in real time, and the accuracy of the parameter data finally outputted by the sensor can be improved.

The embodiments of the disclosure will be explained in detail by way of an example of a sensor used in a VR device. However, the principle revealed in the embodiments of the disclosure may be applicable in a sensor of other devices, so the protection scope of the application is not limited by the specific embodiments described below.

According to an embodiment of the disclosure, the sensor is one applied in a VR device, and in this case, the sensor may comprise a gravitational acceleration sensor or a geomagnetic field sensor. The parameter data outputted by the gravitational acceleration sensor or the geomagnetic field sensor is important for determining a VR pose. The sensor in the VR device is subjected to the influence of an ambient environment, e.g., other magnetic fields in the environment may affect the accuracy of the geomagnetic data provided by the geomagnetic field sensor, which may lead to an error in the VR pose. With the method provided in the embodiments of the disclosure, the interference of the environmental factors with the sensor can be reduced and the accuracy of the parameter data provided by the sensor can be improved.

Figure 1B:
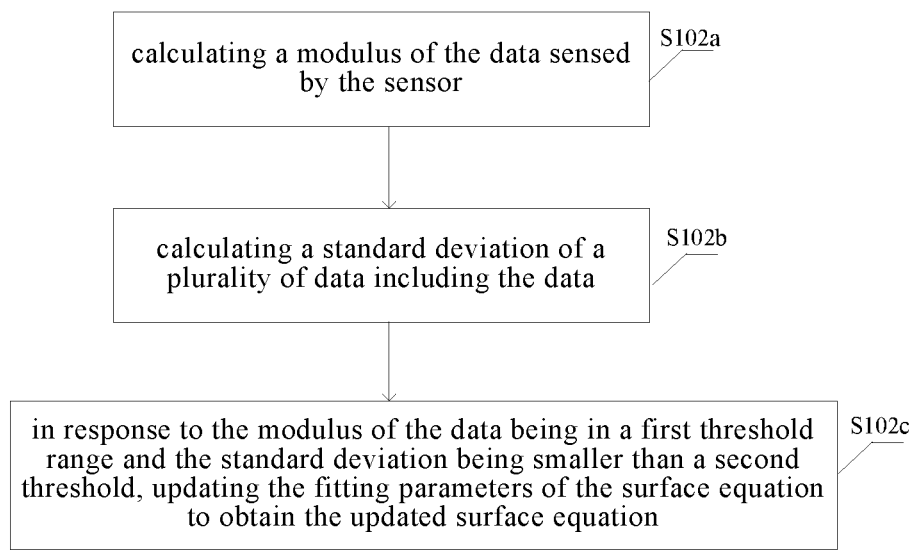
FIG. 1B illustrates details involved in step S102 of the method for obtaining the pose for the VR device shown in FIG. 1B.

According to an embodiment of the disclosure, as shown in FIG. 1B, the step S102 may comprise: S102$a$, calculating a modulus of the data sensed by the sensor; S102$b$, calculating a standard deviation of a plurality data including the data; and S102$c$, in response to the modulus of the data being in a first threshold range and the standard deviation being smaller than a second threshold, updating the fitting parameters of the surface equation to obtain the updated surface equation. In other words, in this embodiment, evaluating the data sensed by the sensor may comprise calculating the modulus of the data and the standard deviation mentioned above. For example, a parameter data (x, y, z) sensed by the geomagnetic field sensor can be regarded as a spatial vector, and then the modulus of the data can be expressed as sqrt(x*x+y*y+z*z). The standard deviation may be obtained based on a plurality of parameter data sensed by the sensor, e.g., several data sensed consecutively by the sensor may be selected to form an array, and thus a standard deviation of the plurality of data in the array can be calculated. The first threshold range and the second threshold can be set according to the sensor and its applications. For example, in an example, the first threshold range may be [50−k, 50+k], where k is be a positive integer smaller than or equal to 5, and then the modulus of the data being in the first threshold range may be understood as an absolute value of a difference between the modulus of the data and the value 50 being smaller than k. When the modulus of the data sensed by the sensor in real time falls outside the first threshold range, it may indicate that the sensed data has been greatly affected by the external environment and hence will not be utilized as basic data for obtaining an updated surface equation. In an embodiment, the state of the device (e.g., a VR device) including the sensor can be judged by calculating the standard deviation from a plurality of data sensed by the sensor. For example, if the calculated standard deviation is smaller than the second threshold, it may indicate that the VR device is in a static state or a slight motion state. Unlike in a strenuous motion state, when the device is in a static state or a slight motion state, the parameter data sensed by the sensor is closer to an actual parameter value, so performing data correction using the parameter data sensed by the sensor when the device is in a static state or a slight motion state may further improve the accuracy of the parameter data finally outputted by the sensor.

According to an embodiment of the disclosure, the surface equation comprises an ellipsoid equation, and accordingly, establishing the surface equation based on the acquired data to surface fit the data may comprise: establishing an ellipsoid equation based on the acquired data to ellipsoid fit the data, and updating the fitting parameters of the surface equation to obtain the updated surface equation may comprise: updating the fitting parameters of the ellipsoid equation to obtain an updated ellipsoid equation. Ellipsoid fitting is suitable for three-dimensional data, and the specific details of the ellipsoid fitting and the ellipsoid equation are well known for those skilled in the art, which will not be described herein for simplicity. The phrase "ellipsoid fit the data" herein means perform ellipsoid fitting to the data.

According to an embodiment of the disclosure, a dedicated storage space may be reserved for storing data for which ellipsoid fitting would be performed. For example, a data index table may be established to store the data initially sensed by the sensor. The ellipsoid equation may be established based on the data in the data index table to perform the ellipsoid fitting. During the operation of the device including the sensor, the data stored in the data index table may be updated to establish an updated ellipsoid equation. The update mentioned herein may refer to replacement of the existing data in the data index table with new data satisfying the evaluation process explained in the previous embodiments. Therefore, in an embodiment, updating the fitting parameters of the ellipsoid equation to obtain the updated ellipsoid equation comprises: replacing the data stored in the data index table with updated data, a modulus of the updated data being in the first threshold range and a standard deviation of a plurality of the updated data being smaller than the second threshold.

The data sensed by the geomagnetic field sensor and the gravitational acceleration sensor are generally three-dimensional data, which can be expressed as a spatial vector (x, y, z). In an embodiment, if the storage size of the data index table is N×N×N, in order to facilitate lookup of the storage address of the data in the data index table, the storage address of the data in the data index table may be set as $(ix+n) \times N \times N + (iy+n) \times N + (iz+n)$, where ix is integer data to which a first coordinate axis component of a vector of the geomagnetic data or a vector of the gravitational acceleration data is rounded down, iy is integer data to which a second coordinate axis component of the vector of the geomagnetic data or the vector of the gravitational acceleration data is rounded down, and iz is integer data to which a third coordinate axis component of the vector of the geomagnetic data or the vector of the gravitational acceleration data is rounded down, ix, iy and iz all falling in the range of $[-n, +n]$, where n and N are both positive integers, and $N=2n+1$.

According to an embodiment of the disclosure, correcting the data sensed by the sensor with the updated surface equation comprises: calculating an ellipsoid center matrix and a correction matrix using the fitting parameters of the updated ellipsoid equation; calculating a difference between a vector of the data sensed by the sensor and the ellipsoid center matrix to obtain a matrix difference, and transposing the matrix difference to obtain a transposition of the matrix difference; calculating a product of the correction matrix and the transposition of the matrix difference to obtain corrected data. It can be understood that in the embodiments of the disclosure, the parameter data initially sensed by the geomagnetic field sensor and the gravitational acceleration sensor are three-dimensional data, and the three-dimensional data are subjected to surface fitting, and the corrected data outputted from the sensor is also three-dimensional data.

Figure 2:
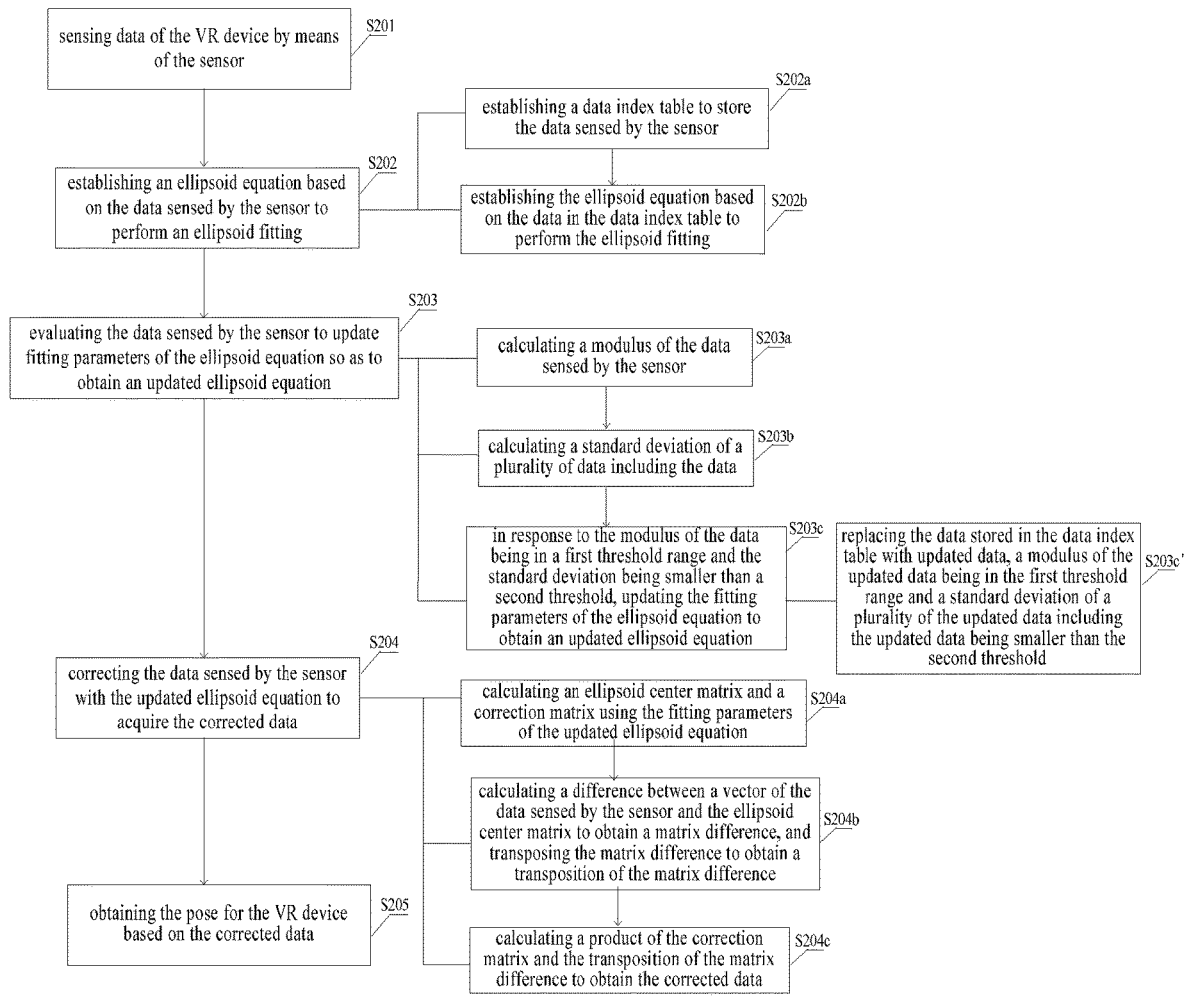
FIG. 2 is a schematic flow chart showing a method for obtaining a pose for a VR device provided in another embodiment of this disclosure.

The method for obtaining a pose for a VR device including the additional steps described above can be illustrated in FIG. 2. As shown in FIG. 2, in the embodiments of the disclosure, the method for obtaining a pose for a VR device comprising: S201, sensing data of the VR device by means of the sensor, the data comprising at least one selected from a group consisting of gyro data, gravitational acceleration data and geomagnetic data; S202, establishing a surface equation based on the data sensed by the sensor to perform surface fitting; S203, evaluating the data sensed by the sensor to update fitting parameters of the surface equation so as to obtain an updated surface equation; S204, correcting the data sensed by the sensor with the surface equation to acquire corrected data; and S205, obtaining the pose for the VR device based on the corrected data. In this embodiment, the step S202 comprises: S202a, establishing a data index table to store the data sensed by the sensor, and S202b, establishing the ellipsoid equation based on the data in the data index table to perform the ellipsoid fitting. The step S203 comprises: S203a, calculating a modulus of the data sensed by the sensor; S203b, calculating a standard deviation of a plurality of data including the data; and S203c, in response to the modulus of the data being in a first threshold range and the standard deviation being smaller than a second threshold, updating the fitting parameters of the surface equation to obtain the updated surface equation. In an embodiment, the step S203c may comprises S203c', replacing the data stored in the data index table with updated data, a modulus of the updated data being in the first threshold range and a standard deviation of a plurality of updated data including the updated data being smaller than the second threshold. In an embodiment, the step S204 comprises: S204a, calculating an ellipsoid center matrix and a correction matrix using the fitting parameters of the updated ellipsoid equation; S204b, calculating a difference between a vector of the data sensed by the sensor and the ellipsoid center matrix to obtain a matrix difference, and transposing the matrix difference to obtain a transposition of the matrix difference, and S204c, calculating a product of the correction matrix and the transposition of the matrix difference to obtain the corrected data.

Figure 3:
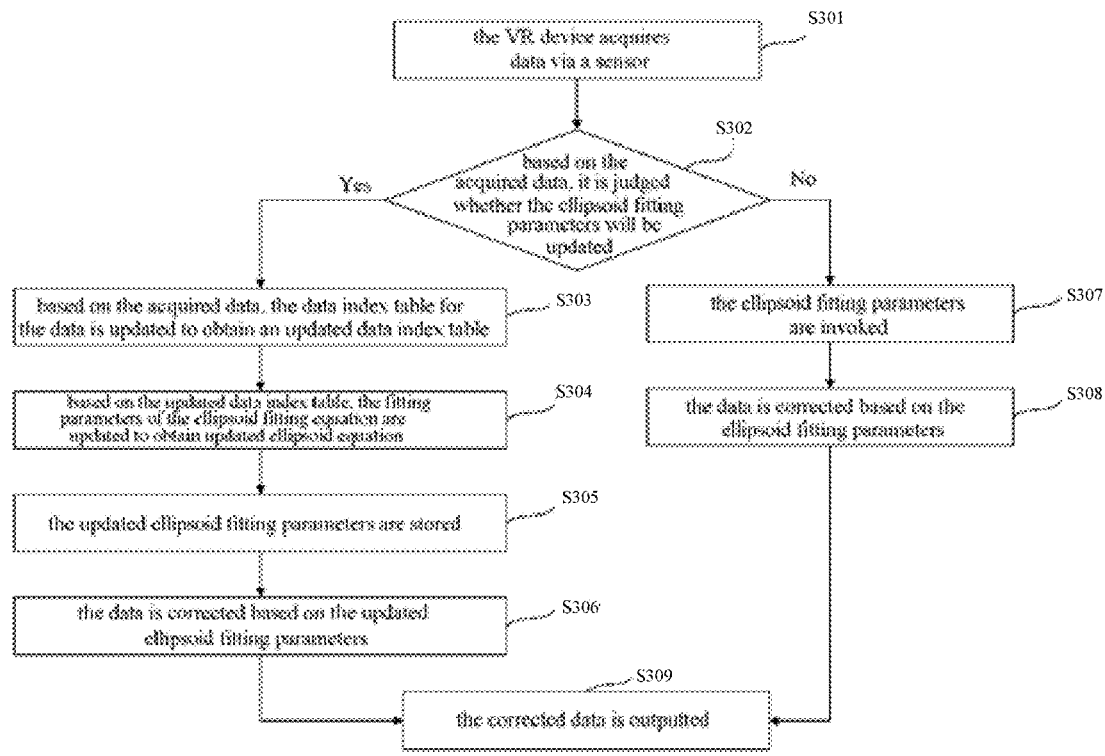
FIG. 3 is a schematic flow chart showing the process for correcting data sensed by a sensor included in the method for obtaining the pose for the VR device in another embodiment of this disclosure.

The method for correcting data sensed by a sensor provided in the embodiments of this disclosure will be explained by way of a more specific example of a sensor in a VR device. FIG. 3 schematically shows a flow chart with more details.

With reference to FIG. 3, in step S301, the VR device acquires data via a sensor. In an embodiment, the sensor in the VR device may acquire gyro data, gravitational acceleration data and geomagnetic data, and with these data, a VR device pose can be determined in real time by means of pose fusion algorithm.

For example, the geomagnetic field sensor in the VR device acquires geomagnetic data which can be expressed as vector M (x, y, z); where x is a value of a first coordinate axis component of the vector M (x, y, z) of the geomagnetic data, y is a value of a second coordinate axis component of the vector M (x, y, z) of the geomagnetic data, and z is a value of a third coordinate axis component of the vector M (x, y, z) of the geomagnetic data, x, y and z are all non-negative real numbers.

In step S302, based on the acquired data, it is judged whether the fitting parameters of the surface equation (e.g., the ellipsoid equation) need to be updated; if so, a step S303 is executed, and if not, a step S307 is executed.

As mentioned above, a modulus of the data acquired by the sensor can be calculated, and a standard deviation of a plurality of data consecutively acquired can be calculated. If the modulus of the data is in the first threshold range and the standard deviation is smaller than the second threshold, the fitting parameters of the surface equation will be updated to obtain the updated surface equation, i.e., the step S303 is started. In an example, if the gravitational acceleration data and the geomagnetic data acquired by the sensors in the VR device both satisfy the following two conditions, the fitting parameters of the ellipsoid equation are updated, and the step S303 is started: condition 1, the data acquired by the sensors in the VR device is less affected by the ambient environment; condition 2, the VR device is in a static state or a slight motion state. If either of the two conditions is not satisfied, the step S307 is executed.

The condition 1 is to judge the extent to which the data is affected by the ambient environment, and the judgment of the data itself needs to start from the tolerance of the data error. In an example, the modulus of the vector M (x, y, z) of the geomagnetic data may be expressed as $R=\mathrm{sqrt}(x \times x + y \times y + z \times z)$, and the unit of x, y and z is Tesla (T). The first threshold range may be expressed as $[A-k, A+k]$, and if "abs(R-A)", the absolute value of the difference between R and A, is smaller than k, it means that the condition 1 is satisfied, i.e., the geomagnetic data acquired by the sensor in the VR device is less affected by the ambient environment. Otherwise, it indicates that the geomagnetic data acquired by the sensor in the VR device is greatly affected by the ambient environment. The condition 2 is to judge the state of the VR device including the sensor, e.g., to mainly judge whether the device is currently in a static state or a slight motion state. In an example, a certain amount of data acquired by the sensor may be grouped into an array, e.g., consecutively acquired ten data are grouped into an array and a standard deviation V_dev of the moduli of data in the array is calculated, and it can be determined that the VR device is in a static state or a slightly motion state if the standard deviation V_dev is smaller than the second threshold. In an example, the value of the second threshold is 5. In step S303, the data stored in the data index table is replaced by updated data so as to obtain an updated data index table. In an embodiment, the updated data comprises data acquired by the sensor and satisfying both the condition 1 and the condition 2. For example, based on a vector of the updated data, an address corresponding to the updated data in the data index table can be inquired; and the original data stored at the address in the data index table is replaced with the updated data, and thus an updated data index table is obtained.

In an example, the acquired data comprises geomagnetic data or gravitational acceleration data, a vector of the data can be expressed as M (x, y, z), and a storage address for the data in the data index table as inquired is the (ix+n)×N×N+(iy+n)×N+(iz+n)-th storage address; where ix is integer data to which a first coordinate axis component x of the vector of the acquired geomagnetic data is rounded down, iy is integer data to which a second coordinate axis component y of the vector of the acquired geomagnetic data is rounded down, and iz is integer data to which a third coordinate axis component z of the vector of the acquired geomagnetic data is rounded down, ix, iy and iz all falling in the range of [−n, +n], and a storage size of the data index table is N×N×N; ix, iy and iz are all integers in unit of Tesla (T); n and N are both positive integers; N=2n+1.

For example, n is 50, and N is 101. The original data stored at the (ix+50)×101×101+(iy+50)×101+(iz+50)-th storage address in the data index table is replaced with the acquired updated geomagnetic data M (x, y, z), thereby obtaining an updated data index table.

In an example, if any of x, y and z is not integer, e.g., x=9.8, x is rounded down, obtaining ix=9. Updating the data index table means the update of part of the data stored in the data index table, and if twenty updated geomagnetic data are acquired, the original data stored in twenty addresses of the data index table will be updated.

In step S304, according to the updated data index table, the fitting parameters of the surface equation (e.g., the ellipsoid equation) are updated to obtain an updated ellipsoid equation.

According to an embodiment of the disclosure, based on the ellipsoid equation and the updated data index table, the fitting parameters of the ellipsoid equation are updated to obtain an updated ellipsoid equation.

In an example where the surface equation is an ellipsoid equation, the updated data index table at least comprises nine data to perform ellipsoid fitting. N×N×N data stored in the updated data index table may all join in the ellipsoid fitting to obtain fitting parameters of the updated ellipsoid equation, which improves the accuracy of the ellipsoid fitting and reduces errors of the fitting.

The ellipsoid equation may be expressed by the following expression:

$$a_1 x^2 + a_2 y^2 + a_3 z^2 + a_4 xy + a_5 xz + a_6 yz + a_7 x + a_8 y + a_9 z = 1$$

$a_1, a_2, a_3, a_4, a_5, a_6, a_7, a_8, a_9$ are updated ellipsoid fitting parameters.

In step S305, the fitting parameters of the updated ellipsoid equation are stored.

Specifically, the originally stored fitting parameters $a_{10}, a_{20}, a_{30}, a_{40}, a_{50}, a_{60}, a_{70}, a_{80}, a_{90}$ are replaced with the fitting parameters, $a_1, a_2, a_3, a_4, a_5, a_6, a_7, a_8, a_9$, of the updated ellipsoid equation and meanwhile the fitting parameters, $a_1, a_2, a_3, a_4, a_5, a_6, a_7, a_8, a_9$ of the updated ellipsoid equation are stored.

In step S306, the data is corrected based on the fitting parameters of the updated ellipsoid equation, and then step S309 is executed.

In an embodiment of this disclosure, step S305 and step S306 may be executed at the same time, or one after another.

In an example, an ellipsoid center matrix P_C and a correction matrix M_C are determined based on the updated ellipsoid fitting parameters $a_1, a_2, a_3, a_4, a_5, a_6, a_7, a_8, a_9$; where, the correction matrix is $$M\_C = \begin{bmatrix} a_1 & \frac{a_4}{2} & \frac{a_5}{2} \\ \frac{a_4}{2} & a_2 & \frac{a_6}{2} \\ \frac{a_5}{2} & \frac{a_6}{2} & a_3 \end{bmatrix},$$

and the ellipsoid center matrix is $P\_C = -\frac{1}{2}[a_7\ a_8\ a_9](M\_C)^{-1}$.

A difference between the vector M (x, y, z) of the geomagnetic data sensed by the sensor and the ellipsoid center matrix P_C is calculated to obtain a matrix difference, and the matrix difference is transposed to obtain a transposition $(M-P\_C)^T$ of the matrix difference; a product of the correction matrix M_C and the transposition $(M-P\_C)^T$ of the matrix difference is calculated to obtain a vector M' of the corrected geomagnetic data.

The vector M' of the corrected geomagnetic data is calculated through the following formula: $M' = M\_C \times (M-P\_C)^T$, where T denotes the transposition of $(M-P\_C)$, and the ellipsoid center matrix P_C and the correction matrix M_C are calculated based on the fitting parameters $a_1, a_2, a_3, a_4, a_5, a_6, a_7, a_8, a_9$ of the updated ellipsoid equation.

In step S307, the fitting parameters of the surface equation (e.g., the ellipsoid equation) are invoked. Prior to step S307, it has been determined that the surface equation is not to be updated, so in step S307, the fitting parameters $a_{10}, a_{20}, a_{30}, a_{40}, a_{50}, a_{60}, a_{70}, a_{80}, a_{90}$ of the ellipsoid equation stored last time (i.e., no update is made this time) are invoked.

In step S308, the data is corrected with the fitting parameters of the ellipsoid equation stored last time.

Similarly, the ellipsoid center matrix P_C and the correction matrix M_C can be determined based on the fitting parameters $a_{10}, a_{20}, a_{30}, a_{40}, a_{50}, a_{60}, a_{70}, a_{80}, a_{90}$ of the ellipsoid equation; the difference between the vector M (x, y, z) of the acquired geomagnetic data and the ellipsoid center matrix P_C is transposed to obtain a transposition $(M-P\_C)^T$ of the matrix difference; a product of the correction matrix M_C and the transposition $(M-P\_C)^T$ of the matrix difference is calculated to get a vector M' of the corrected geomagnetic data.

Now, the vector M' of the corrected geomagnetic data is calculated through the following formula: $M' = M\_C \times (M-P\_C)^T$, wherein T denotes the transposition of $(M-P\_C)$, and the ellipsoid center matrix P_C and the correction matrix M_C are calculated based on the ellipsoid fitting parameters $a_{10}, a_{20}, a_{30}, a_{40}, a_{50}, a_{60}, a_{70}, a_{80}, a_{90}$.

In step S309, the corrected data is outputted.

In other words, after the step S306, the vector M' of the corrected geomagnetic data outputted is obtained based on the updated ellipsoid fitting parameters $a_1, a_2, a_3, a_4, a_5, a_6, a_7, a_8, a_9$; and after step S308, the vector M' of the corrected geomagnetic data outputted is obtained based on the ellipsoid fitting parameters $a_{10}, a_{20}, a_{30}, a_{40}, a_{50}, a_{60}, a_{70}, a_{80}, a_{90}$.

Based on a same inventive concept as the aforementioned embodiments, in another embodiment of this disclosure, A virtual reality (VR) device is provided.

Figure 4:
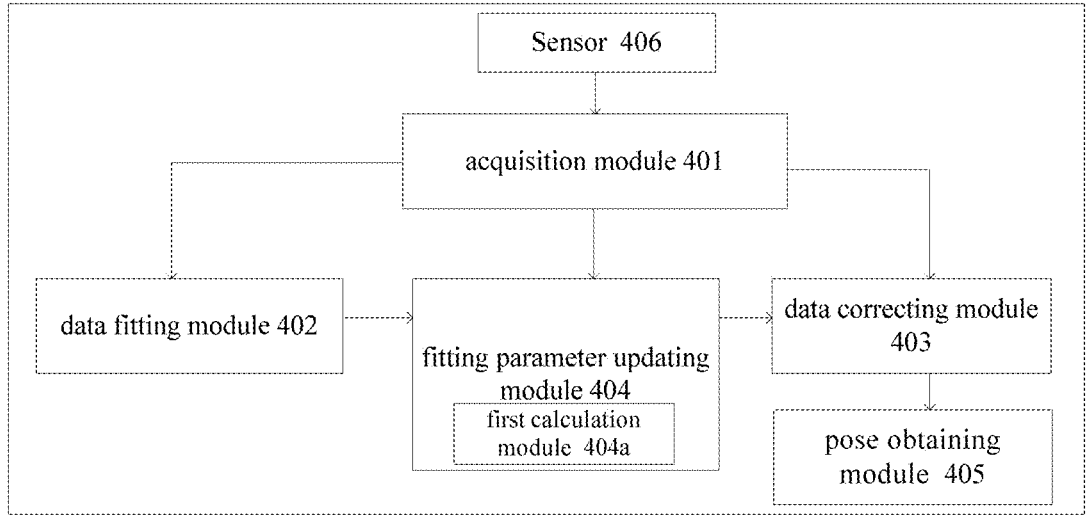
FIG. 4 is a structural diagram of VR device provided in an embodiment of this disclosure.

FIG. 4 schematically shows a structural diagram of the VR device provided in an embodiment of this disclosure. As shown in FIG. 4, the VR device comprises an acquisition module 401, a data fitting module 402, a data correcting module 403, a fitting parameter updating module 404, a pose obtaining module 405 and a sensor 406. The acquisition module 401 is configured to acquire the data sensed by the sensor; the data fitting module 402 is configured to establish a surface equation based on the acquired data to surface fit the data; the data correcting module 403 is configured to correct the data sensed by the sensor with the surface equation; and the fitting parameter updating module 404 is configured to evaluate the acquired data sensed by the sensor to update fitting parameters of the surface equation so as to obtain an updated surface equation. According to an embodiment of this disclosure, the data correcting module 403 is further configured to correct the data sensed by the sensor with the updated surface equation. The acquisition module 401 may receive the initial data acquired by the sensor through sensing, and may be implemented as including an analog/digital conversion circuit and a storage circuit. The analog/digital conversion circuit may convert the initial analogue data sensed by the sensor into digital data signals, and the storage circuit may temporarily store the digital data signals. In an example, the acquisition module 301 may further be implemented as including a filtering circuit for filtering the initial data signals that have been acquired.

In an embodiment, the sensor 406 comprises a gravitational acceleration sensor or a geomagnetic field sensor, and the fitting parameter updating module 404 comprises a first calculation module 404a configured to calculate a modulus of the data sensed by the sensor and a standard deviation of a plurality of the data, and the fitting parameter updating module 404 is configured to, in response to the modulus of the data being in a first threshold range and the standard deviation being smaller than a second threshold, update the fitting parameters of the surface equation to obtain the updated surface equation.

Figure 5:
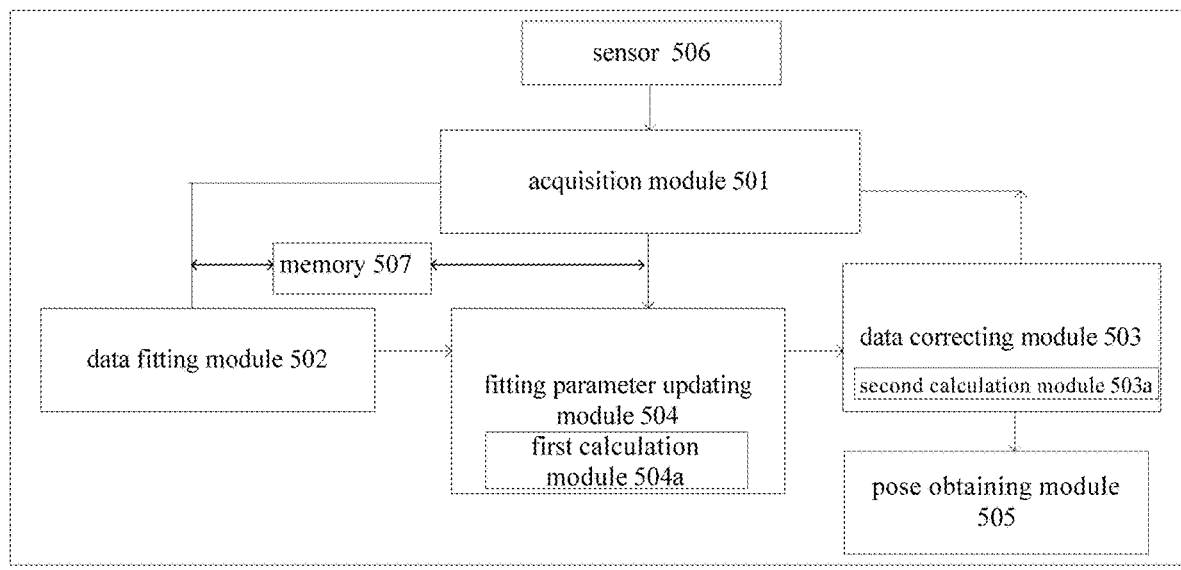
FIG. 5 is a structural diagram of VR device provided in another embodiment of this disclosure.

According to an embodiment of the disclosure, the data fitting module 402 is configured to establish an ellipsoid equation based on the acquired data to ellipsoid fit the data, and the fitting parameter updating module 404 is configured to update the fitting parameters of the ellipsoid equation to obtain an updated ellipsoid equation. As shown in FIG. 5, in another embodiment, the VR device comprises a memory 507 configured to store the data sensed by the sensor, and the data fitting module 502 establishes an ellipsoid equation based on the data stored in the memory 507 to perform the ellipsoid fitting, and the fitting parameter updating module 504 is further configured to replace the data stored in the memory 505 with updated data, a modulus of the updated data being in the first threshold range and a standard deviation of a plurality of the updated data being smaller than the second threshold.

According to an embodiment of this disclosure, the data correcting module 503 comprises a second calculation module 503a configured to: calculate an ellipsoid center matrix and a correction matrix using the fitting parameters of the updated ellipsoid equation, calculate a difference between a vector of the data sensed by the sensor and the ellipsoid center matrix to obtain a matrix difference, and transpose the matrix difference to obtain a transposition of the matrix difference; and calculate a product of the correction matrix and the transposition of the matrix difference to obtain corrected data.

According to an embodiment of this disclosure, for the VR device provided in the embodiments of the disclosure, the data fitting module, the data correcting module (including the second calculation module) and the fitting parameter updating module (including the first calculation module) may be implemented in the form of pure software, or in the form of a combination of software and hardware circuits. Software corresponding to different modules may be stored in different processors and executed by different processors to achieve corresponding functions. Alternatively, the software corresponding to different modules may also be executed by one and the same processor. Therefore, the different modules may be embodied in the form of processors or controllers. Those skilled in the art may implement, with ordinary technical knowledge of the art, the ellipsoid fitting disclosed herein, and specific calculations related to the ellipsoid fitting will not be described herein for simplicity.

For embodiments about the VR device not detailed, please refer to the above method embodiments. The VR device provided in the embodiment of this disclosure can achieve beneficial effects similar to the above method embodiments, which will not be detailed herein for simplicity.

Figure 6:
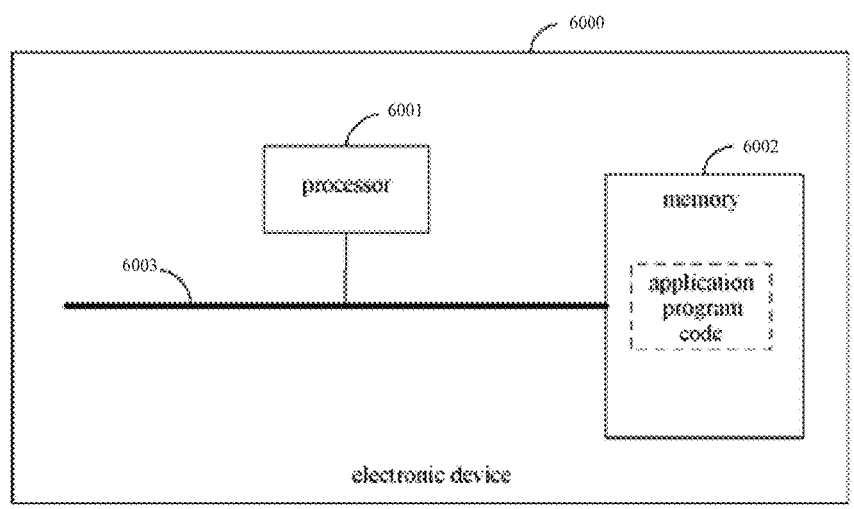
FIG. 6 is a schematic structure view of an electronic device provided in an embodiment of this disclosure.

Based on the same inventive concept, in still another embodiment of this disclosure, an electronic device is provided, the electronic device comprising a processor configured to implement the method according to any of the above method embodiments. Apart from the processor, the electronic device may further comprise any other essential parts. FIG. 6 schematically shows a structural diagram of the electronic device according to an embodiment of this disclosure. As shown in FIG. 6, the electronic device 6000 comprises at least one processor 6001, a memory 6002 and a bus 6003. The processor 6001 is electrically connected with the memory 6002, the memory 6002 is configured to store computer-executable instructions, and the processor 6001 is configured to execute the computer-executable instructions so as to implement the steps of the method for correcting data sensed by a sensor according to any of the above embodiments.

According to an embodiment of this disclosure, the processor 6001 comprises but is not limited to field-programmable gate array (FPGA) or other devices having a logical processing capability, e.g., a microcontroller unit (MCU), a central process unit (CPU).

According to an embodiment of this disclosure, the electronic device may comprise the virtual reality (VR) device.

Based on the same inventive concept, a computer-readable storage medium is further provided in the embodiments of this disclosure, comprising a computer program stored thereon, the computer program being configured to implement the steps of the method for correcting data sensed by a sensor according to any of the above embodiments when run on a computer.

The computer-readable storage medium provided in the embodiments of this disclosure comprises but is not limited to disk of any type (including floppy disk, hard disk, optical disk, CD-ROM, and magneto-optical disk), Read Only memory (ROM), Random Access Memory (RAM), Erasable Programmable Read-Only Memory (EPROM), Electrically Erasable Programmable Read-Only Memory (EEPROM), Flash memory, magnetic or photosensitive card. In other words, the readable storage medium comprises any medium storing or transmitting information in a form readable for a device (e.g., a computer).

Those skilled in the art can understand that each block of the structural diagrams and/or block diagrams and/or flow charts and a combination of blocks in the structural diagrams and/or block diagrams and/or flow charts may be implemented by computer program instructions. Those skilled in the art can understand that these computer program instructions may be provided to and implemented by a general purpose computer, a special purpose computer, or other processors capable of programming data processing methods, thereby implementing, by the computer or other processors capable of other programming data processing methods, the solution specified in one or more blocks of the structural diagrams and/or block diagrams and/or flow charts disclosed in the present application.

Those skilled in the art can understand that the steps, measures and solutions in the operations, methods and flow charts that have been discussed in this disclosure may be replaced, modified, combined or deleted. Furthermore, other steps, measures and solutions in embodiments comprising the operations, methods and flow charts that have been discussed in the disclosure may also be replaced, modified, reset, decomposed, combined or deleted.

What is stated above is only part of the embodiments of this disclosure, and it should be pointed out that, for one having ordinary skills in the art, several improvements and modifications can also be made without deviating from the principles of the disclosure, and such improvements and modifications should also be deemed as falling within the protection scope of the application.

The invention claimed is:

1. A method for obtaining a pose for a VR device, the VR device comprising a sensor, the method comprising:
   sensing data of the VR device by means of the sensor, the data comprising at least one selected from a group consisting of gyro data, gravitational acceleration data and geomagnetic data;
   establishing a surface equation based on the data sensed by the sensor to perform surface fitting;
   correcting the data sensed by the sensor with the surface equation to acquire corrected data; and
   obtaining the pose for the VR device based on the corrected data,
   wherein the method further comprises:
      evaluating the data sensed by the sensor to update fitting parameters of the surface equation so as to obtain an updated surface equation, and
      correcting the data sensed by the sensor with the updated surface equation to acquire the corrected data,
   wherein the evaluating the data sensed by the sensor to update fitting parameters of the surface equation so as to obtain the updated surface equation comprises:
      calculating a modulus of the data sensed by the sensor;
      calculating a standard deviation of a plurality of data including the data; and
      in response to the modulus of the data being in a first threshold range and the standard deviation being smaller than a second threshold, updating the fitting parameters of the surface equation to obtain the updated surface equation,
   wherein the establishing the surface equation based on the data sensed by the sensor to perform the surface fitting comprises:
      establishing an ellipsoid equation based on the data sensed by the sensor to perform an ellipsoid fitting,
   wherein the updating the fitting parameters of the surface equation to obtain the updated surface equation comprises:
      updating the fitting parameters of the ellipsoid equation to obtain an updated ellipsoid equation,
   wherein the establishing the ellipsoid equation based on the data sensed by the sensor to perform the ellipsoid fitting comprises:
      establishing a data index table to store the data sensed by the sensor, and
      establishing the ellipsoid equation based on the data in the data index table to perform the ellipsoid fitting, and
   wherein the updating the fitting parameters of the ellipsoid equation to obtain the updated ellipsoid equation comprises:
      replacing the data stored in the data index table with updated data, a modulus of the updated data being in the first threshold range and a standard deviation of a plurality of updated data including the updated data being smaller than the second threshold.

2. The method according to claim 1, wherein the sensor comprises a gravitational acceleration sensor or a geomagnetic field sensor.

3. The method according to claim 1, wherein the data sensed by the sensor comprises the geomagnetic data and the gravitational acceleration data, and a storage address of the data in the data index table is $(ix+n) \times N \times N + (iy+n) \times N + (iz+n)$,
   wherein ix is integer data to which a first coordinate axis component of a vector of the geomagnetic data or the gravitational acceleration data is rounded down, iy is integer data to which a second coordinate axis component of the vector of the geomagnetic data or the gravitational acceleration data is rounded down, and iz is integer data to which a third coordinate axis component of the vector of the geomagnetic data or the gravitational acceleration data is rounded down, ix, iy and iz all falling in a range of $[-n, +n]$, a storage size of the data index table is $N \times N \times N$; n and N are both positive integers, $N=2n+1$.

4. The method according to claim 1, wherein the correcting the data sensed by the sensor with the updated surface equation comprises:
   calculating an ellipsoid center matrix and a correction matrix using the fitting parameters of the updated ellipsoid equation;
   calculating a difference between a vector of the data sensed by the sensor and the ellipsoid center matrix to obtain a matrix difference, and transposing the matrix difference to obtain a transposition of the matrix difference, and
   calculating a product of the correction matrix and the transposition of the matrix difference to obtain the corrected data.

5. An electronic device comprising a processor, the processor being configured to implement the method according to claim 1.

6. A non-transitory computer-readable storage medium comprising a computer program, the computer program being configured to implement the method according to claim 1 when running on a computer.

7. A VR device comprising a sensor, the sensor being configured to sense data of the VR device, the VR device comprising:

an acquisition module configured to acquire the data sensed by the sensor, the acquisition module comprising an analog to digital conversion circuit and a storage circuit;

a data fitting module configured to establish a surface equation based on the data sensed by the sensor to perform surface fitting;

a data correcting module configured to correct the data sensed by the sensor with the surface equation to acquire corrected data, and a pose obtaining module configured to obtain the pose for the VR device based on the corrected data, wherein the VR device further comprises a fitting parameter updating module configured to evaluate the data sensed by the sensor to update fitting parameters of the surface equation so as to obtain an updated surface equation, wherein the data correcting module is further configured to correct the data sensed by the sensor with the updated surface equation, wherein the sensor comprises a gravitational acceleration sensor or a geomagnetic field sensor, wherein the fitting parameter updating module comprises a first calculation module configured to calculate a modulus of the data sensed by the sensor and a standard deviation of a plurality data including the data sensed by the sensor, and wherein the fitting parameter updating module is configured to, in response to the modulus of the data being in a first threshold range and the standard deviation being smaller than a second threshold, update the fitting parameters of the surface equation to obtain the updated surface equation, wherein the data fitting module is configured to establish an ellipsoid equation based on the data sensed by the sensor to perform an ellipsoid fitting, and the fitting parameter updating module is configured to update the fitting parameters of the ellipsoid equation to obtain an updated ellipsoid equation, wherein the VR device comprises a memory configured to store the data sensed by the sensor, wherein the data fitting module establishes the ellipsoid equation based on the data stored in the memory to perform the ellipsoid fitting, and wherein the fitting parameter updating module is further configured to replace the data stored in the memory with updated data, a modulus of the updated data being in the first threshold range and a standard deviation of a plurality of the updated data including the updated data being smaller than the second threshold.

8. The VR device according to claim 7, wherein the data correcting module comprises a second calculation module, the second calculation module is configured to calculate an ellipsoid center matrix and a correction matrix using the fitting parameters of the updated ellipsoid equation, calculate a difference between a vector of the data sensed by the sensor and the ellipsoid center matrix to obtain a matrix difference, transpose the matrix difference to obtain a transposition of the matrix difference, and calculate a product of the correction matrix and the transposition of the matrix difference to obtain the corrected data.

* * * * *